United States Patent [19]

Kreissl et al.

[11] Patent Number: 4,757,209
[45] Date of Patent: Jul. 12, 1988

[54] DRIVE FOR A NEUTRON CHOPPER

[75] Inventors: Ottmar Kreissl, Karlsfeld; Arnold Seeger, Herzogenrath, both of Fed. Rep. of Germany

[73] Assignees: M.A.N. Maschinenfabrik Augsburg-Nurnberg Aktiengesellschaft; KFA Kernforschungsanlage GmbH, both of Munich, Fed. Rep. of Germany

[21] Appl. No.: 769,588

[22] Filed: Aug. 26, 1985

[30] Foreign Application Priority Data

Sep. 6, 1984 [DE] Fed. Rep. of Germany ....... 3432775

[51] Int. Cl.$^4$ ............................................. G21K 1/04
[52] U.S. Cl. .................................. 250/505.1; 250/251
[58] Field of Search ...................... 250/251, 505.1, 233; 350/274, 275; 378/160

[56] References Cited

U.S. PATENT DOCUMENTS 3,729,264  4/1973  Simazaki et al. .................. 250/505.1
4,207,465  6/1980  Favre et al. ......................... 250/288
4,417,171  11/1983  Schmitmann ........................ 378/144

FOREIGN PATENT DOCUMENTS 255420  3/1970  U.S.S.R. .............................. 250/251

OTHER PUBLICATIONS

Zatselyapin, Instrum. Exper. Tech., No. 6, Nov.-Dec. 1969, pp. 1555-1556.

Primary Examiner—Craig E. Church
Assistant Examiner—Jack I. Berman
Attorney, Agent, or Firm—Alan H. Levine

[57] ABSTRACT

In order to make possible precisely controlled and reliable operation of the rotors of a neutron chopper each rotor is to be driven by a hysteresis motor, whose rotor is in the form of a hollow cylinder. The attachment of each drive rotor to the one end of the rotor is by way of a non-magnetic disk or ring which is screwed to the lower end of the rotor or the top end thereof in accordance with the design. The drive rotor is only shrunk onto the disk or ring. The stator placed around the drive rotor is embedded within the neutron chopper housing in an electrically insulating cast material which is not affected by high vacuum and radiation.

6 Claims, 1 Drawing Sheet

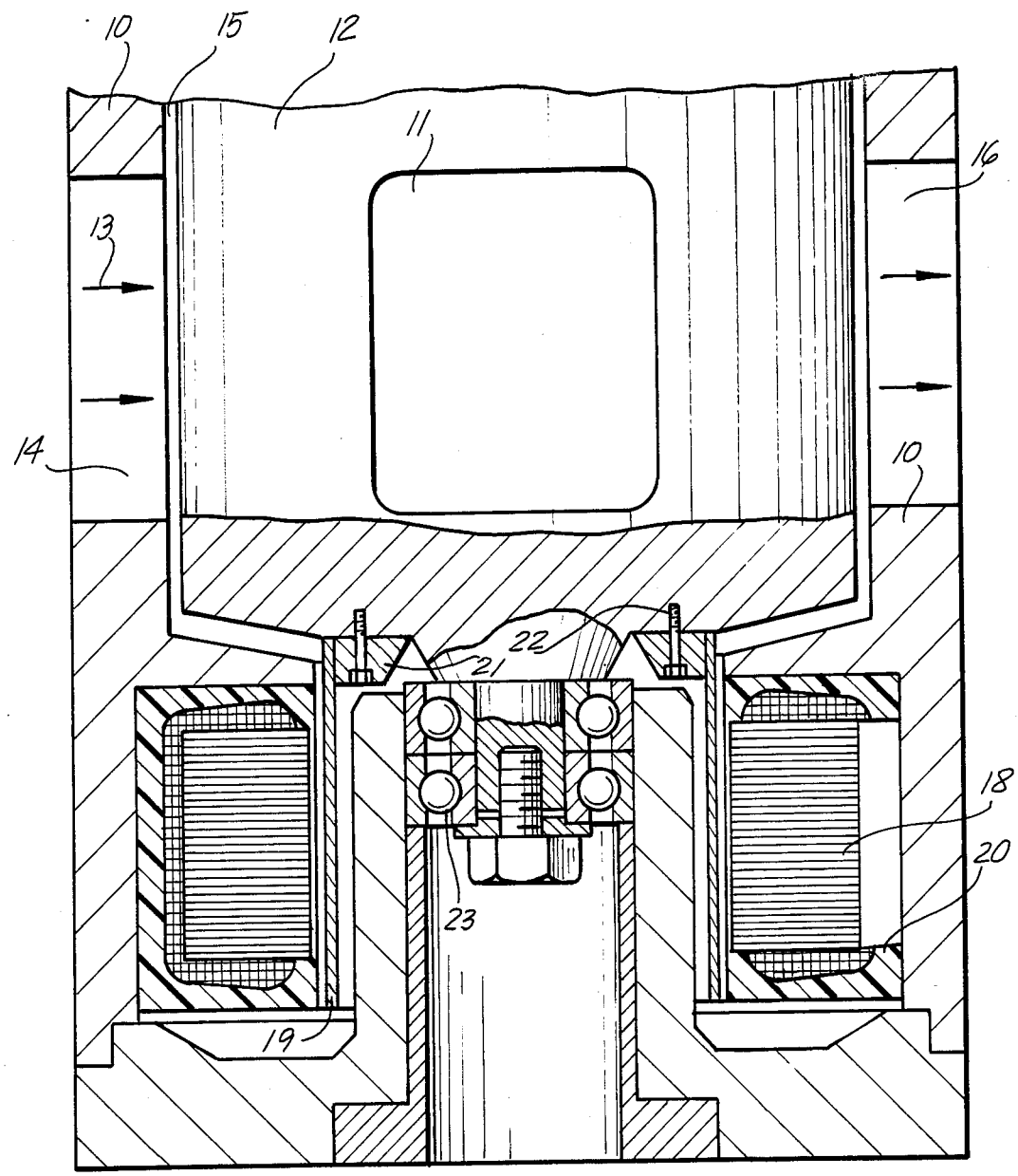

DRIVE FOR A NEUTRON CHOPPER

BACKGROUND OF THE INVENTION

The present invention relates to a drive for a neutron chopper comprising a stator and drive rotor connected with the rotor of the neutron chopper.

Known neutron choppers have been designed with successively placed rotors having radiation windows, the rotors being individually driven by means of synchronous motors with laminated rotors mounted on their shafts. The production of such braced laminated rotors is extremely involved, since the set of laminations has to be produced in several working steps with intermediate stretching by centrifugal force.

SHORT SUMMARY OF THE INVENTION

One object of the invention is to devise a drive of the sort noted which is extremely simple to manufacture.

A further aim of the invention is to devise such a drive that makes possible the satisfactory operation of the rotors of neutron choppers.

In order to attain these or other objects that may become apparent in the course of the ensuing specification, in accordance with the invention a drive for a neutron chopper takes the form of a drive rotor connected with the rotor of the said chopper, and a stator, said drive rotor being manufactured of high-tensile steel in the form of a hollow cylinder, one end of said drive rotor being connected concentrically with said chopper rotor, said stator concentrically surrounding said drive rotor.

The employment of a hysteresis motor makes possible stable synchronous running, it being possible for the motor to be run up to speed asynchronously with a short and simple running up period. The hollow cylindrical drive rotor, which may be produced by cold forming or hot forming in a single operation, makes it possible for the chopper rotor shaft to be made very much shorter than in the system so far known. This and the low weight of the drive rotor make for a very much lower overall moment of inertia.

The connection of the hollow cylindrical drive rotor with the chopper rotor may be preferably by way of a disk or wheel on which the one end of the drive rotor is attached by a press fit. The disk, which may be in the form of an annular disk with spokes, and is made of a non-magnetic material, may be readily attached to the end plate of the drive rotor for example.

The annular stator is arranged concentrically around the drive rotor and it is embedded in a radiation resistant and electrically insulating cast composition, which is furthermore resistant to high vacuum. The stator is anchored in the housing of the neutron chopper.

DETAILED ACCOUNT OF WORKING EXAMPLE OF THE INVENTION

One embodiment of the invention is shown diagrammatically in the drawing.

In the housing 10, shown only in part, of a neutron chopper a rotor 12 is mounted that has two opposite windows 11. The rotor 12 is supported in bearings at its top end (not shown) and its lower end. The neutron beam 13 passes through a quartz window 14 into the evacuated rotor chamber 15, from which either passes through the windows 11 in the rotor 12 to the exit window 16 or is diverted by the wall of the rotor, dependent on the position of the rotor.

The metering of the neutrons, which are to pass through the exit window 16, is dependent on the speed with which the rotor 12 rotates. Precise metering is brought about by placing a number of rotors 12 in series, the speeds of rotation thereof having to attain values of up to 50,000 rpm. The specification for the drive a correspondingly high.

The drive to be seen in the drawing is in the form of hysteresis motor with a stator 18 and a drive rotor 19. The stator 18 is embedded in cast material 20 within the neutron chopper housing 10, which consists of an electrically insulating material, which is resistant to high vacuum and radiation. Concentrically placed within the stator there is a rotor 19 in the form of a hollow cylinder, which has its upper end shrunk onto a ring 21 of non-magnetic material. By screwing the ring 21 at 22 onto the floor of the rotor 12 the drive rotor 19 is joined to the chopper rotor 12.

The hollow cylindrical form of the drive rotor 19 makes it possible to have a lower bearing 23 within the hollow cylinder near the low end of the chopper rotor so that it is not necessary to have a long and weighty rotor shaft.

We claim:

1. A neutron chopper comprising:
   a chopper rotor,
   bearings at each end of the chopper rotor supporting the rotor for rotation about an axis transverse to the neutron beam to be chopped, and
   a motor for driving the chopper rotor, the motor including:
   a hollow cylindrical steel rotor coaxially arranged with respect to the chopper rotor, the motor rotor surrounding the bearing at one end of the chopper rotor but the motor rotor being radially spaced from the bearing which it surrounds, so that the motor rotor is not directly supported by said bearing, and
   a ring of non-magnetic material fixed to, and coaxial with, said one end of the chopper rotor, the motor rotor being fixed to the ring, whereby the ring serves to interconnect the chopper and motor rotors.

2. A neutron chopper as defined in claim 1 wherein one end of the motor rotor is fixed to the ring, the other end of the motor rotor being free of attachment to any other part of the neutron chopper.

3. A neutron chopper as defined in claim 1 including a stator concentrically surrounding the motor rotor.

4. A neutron chopper as defined in claim 3 wherein the stator is embedded in an electrically insulating material which is resistant to neutron radiation.

5. A neutron chopper as defined in claim 1 wherein the motor rotor is press fit on to the ring.

6. A neutron chopper as defined in claim 1 wherein the motor is a hysteresis type motor.

* * * * *